(12) United States Patent
Movellan et al.

(10) Patent No.: US 9,202,110 B2
(45) Date of Patent: Dec. 1, 2015

(54) AUTOMATIC ANALYSIS OF RAPPORT

(71) Applicant: Emotient, San Diego, CA (US)

(72) Inventors: Javier Movellan, La Jolla, CA (US); Marian Steward Bartlett, San Diego, CA (US); Ian Fasel, San Diego, CA (US); Gwen Ford Littlewort, Solana Beach, CA (US); Joshua Susskind, La Jolla, CA (US); Jacob Whitehill, Cambridge, MA (US)

(73) Assignee: Emotient, Inc., San Diego, CA (US)

( * ) Notice: Subject to any disclaimer, the term of this patent is extended or adjusted under 35 U.S.C. 154(b) by 0 days.

(21) Appl. No.: 14/185,918

(22) Filed: Feb. 20, 2014

(65) Prior Publication Data

US 2014/0314310 A1    Oct. 23, 2014

Related U.S. Application Data

(60) Provisional application No. 61/766,866, filed on Feb. 20, 2013.

(51) Int. Cl.
 *G06K 9/62* (2006.01)
 *G06K 9/00* (2006.01)

(52) U.S. Cl.
 CPC ........ *G06K 9/00302* (2013.01); *G06K 9/00315* (2013.01); *G06K 9/627* (2013.01)

(58) Field of Classification Search
 CPC .......... G06K 9/00275; G06K 9/00221; G06K 9/00302; G06K 9/00308; G06K 9/00315; G06K 9/6256; G06K 9/627
 USPC ........................ 382/155, 197; 705/14.49, 500
 See application file for complete search history.

(56) References Cited

U.S. PATENT DOCUMENTS

| | | | |
|---|---|---|---|
| 2007/0121824 A1 | 5/2007 | Agapi et al. | |
| 2008/0151038 A1 | 6/2008 | Khouri et al. | |
| 2013/0039483 A1 | 2/2013 | Wolfeld et al. | |
| 2014/0063236 A1* | 3/2014 | Shreve et al. | 348/143 |

* cited by examiner

*Primary Examiner* — Mike Rahmjoo
(74) *Attorney, Agent, or Firm* — Acuity Law Group, P.C.; Daniel M. Chambers

(57) ABSTRACT

In selected embodiments, one or more wearable mobile devices provide videos and other sensor data of one or more participants in an interaction, such as a customer service or a sales interaction between a company employee and a customer. A computerized system uses machine learning expression classifiers, temporal filters, and a machine learning function approximator to estimate the quality of the interaction. The computerized system may include a recommendation selector configured to select suggestions for improving the current interaction and/or future interactions, based on the quality estimates and the weights of the machine learning approximator.

9 Claims, 3 Drawing Sheets

AUTOMATIC ANALYSIS OF RAPPORT

CROSS-REFERENCE TO RELATED APPLICATION

This application claims priority from U.S. provisional patent application Ser. No. 61/766,866, entitled AUTOMATIC ANALYSIS OF NON-VERBAL RAPPORT, filed on Feb. 20, 2013, which is hereby incorporated by reference in its entirety as if fully set forth herein, including text, figures, claims, tables, and computer program listing appendix (if present), and all other matter in the United States provisional patent application.

FIELD OF THE INVENTION

This document relates generally to techniques for automatically analyzing rapport between people during interactions.

BACKGROUND

Many people do not accomplish their full potential during interactions with other people. Such interactions may include, for example, face-to-face and videoconferencing encounters such as sales and other business transactions, customer service dealings, job interviews, video dating, and others. Many people also fail to appreciate the impressions they make on other people, as well as the aggregate effect of their conduct in the presence of other people. Indeed, it is difficult to improve one's interaction skills and other behavioral skills without appropriate assessment of response of other people, and feedback based on the assessment. Such feedback is often unavailable; when available, it is likely to be expensive, delayed (not being provided substantially in real time, that is, during the interaction), and lack objectivity. There are, therefore, needs to facilitate assessment of individual interactions and other skills affecting private and public perception, provide feedback regarding interactions and general appearance, reduce the costs associated with training individuals in face-to-face interactions and other behaviors, and to inject objectivity into assessment of interactions and behaviors.

SUMMARY

Selected embodiments described in this document facilitate analysis of the quality of non-verbal rapport established between people during interactions, as well as analysis of the impressions made by a person upon one or more other persons. Objective measures of rapport may be obtained automatically for overall rapport during an interaction, and for specific portions of the interaction, on long, medium, and short time scales. Advice on how to improve interactions may be provided to one or more of the participants, based on the analysis of the rapport. Additionally, objective measures of the impressions made by a person on one or more other people may be provided automatically. The objective measures may be aggregated over different people and/or over time. Facial expressions, head poses, and gestures may be used to derive the measures of rapport. The facial expressions, head poses, and gestures may be obtained using wearable devices, for example, Google Glass devices. The assessment and feedback may be delayed, or provided in real time or substantially in real time. In operation, assessments of positive and negative sentiments between employees (e.g., sales associates and service representatives) and customers are provided in substantially real time, that is, during the course of the interaction. The facial expression of the employees may be provided by store cameras, while wearable device such as Google Glass worn by the employees may provide the facial expressions of the customers. Records of the interactions and the associated assessments may be stored and used for training and real time feedback.

In an embodiment, a computer system for estimating quality of an interaction between a first participant and a second participant includes a plurality of machine learning classifiers of extended facial expressions, each classifier of the plurality of classifiers being configured to generate a stream of estimates of the degree to which a predetermined emotion or affective state corresponding to said each classifier of the plurality of classifiers is present in a data stream of a first participant. The system also includes a plurality of temporal filters, each filter of the plurality of temporal filters comprising an input connected to receive output of an associated classifier of the plurality of classifiers, and an output. The system further includes a machine learning function approximator configured to receive output signals from the plurality of temporal filters, the function approximator being trained to generate one or more estimates of quality of the interaction between the first and second participants based on the output signals of the plurality of temporal filters.

In an embodiment, a computer system for estimating quality of an interaction between a first participant and a second participant includes a first plurality of machine learning classifiers of extended facial expressions, each classifier of the first plurality of classifiers being configured to generate a stream of first estimates of the degree to which a predetermined emotion or affective state corresponding to said each classifier of the first plurality of classifiers is present in a data stream of the first participant; a second plurality of machine learning classifiers of extended facial expressions, each classifier of the second plurality of classifiers being configured to generate a stream of second estimates of the degree to which a predetermined emotion or affective state corresponding to said each classifier of the second plurality of classifiers is present in a data stream of the second participant, wherein the first and second data streams are synchronized; a first plurality of temporal filters, each filter of the first plurality of temporal filters comprising an input connected to receive output of an associated classifier of the first plurality of classifiers, and an output; a second plurality of temporal filters, each filter of the second plurality of temporal filters comprising an input connected to receive output of an associated classifier of the second plurality of classifiers, and an output; a plurality of correlators configured to receive output signals from the first and second pluralities of temporal filters and to identify correlation patterns in the output signals of the first and second pluralities of temporal filters; and a function approximator configured to receive at least some of output signals of the plurality of correlators, the output signals of the first plurality of temporal filters, and the output signals of the second plurality of temporal filters, the function approximator being machine trained to generate one or more estimates of quality of the interaction between the first participant and the second participant based on at least some of the output signals of the plurality of correlators, the output signals of the first plurality of temporal filters, and the output signals of the second plurality of temporal filters.

In an embodiment, a computer-implemented method for estimating quality of an interaction between a first participant and a second participant includes processing a data stream of the first participant with a first plurality of machine learning classifiers of extended facial expressions, each classifier of the first plurality of classifiers being configured to generate a stream of first estimates of the degree to which a predetermined emotion or affective state corresponding to said each classifier of the first plurality of classifiers is present in the data stream of the first participant; processing a data stream of the second participant with a second plurality of machine learning classifiers of extended facial expressions, each classifier of the second plurality of classifiers being configured to generate a stream of second estimates of the degree to which a predetermined emotion or affective state corresponding to said each classifier of the second plurality of classifiers is present in the data stream of the second participant, wherein the first and second data streams are synchronized; processing signals at outputs of the first plurality of classifiers with a first plurality of temporal filters, each filter of the first plurality of temporal filters comprising an input connected to receive output of an associated classifier of the first plurality of classifiers, and a temporal filter output; processing signals at outputs of the second plurality of classifiers with a second plurality of temporal filters, each filter of the second plurality of temporal filters comprising an input connected to receive output of an associated classifier of the second plurality of classifiers, and a temporal filter output; correlating output signals from the first and second pluralities of temporal filters to identify correlation patterns in the output signals of the first and second pluralities of temporal filters, thereby obtaining a plurality of correlator output signals; and generating with a machine learning function approximator one or more estimates of quality of the interaction between the first participant and the second participant based on at least some of the plurality of correlator output signals, the temporal filter outputs of the first plurality of temporal filters, and the temporal filter outputs of the second plurality of temporal filters.

These and other features and aspects of the present disclosure will be better understood with reference to the following description, drawings, and appended claims.

DETAILED DESCRIPTION

Figure 1:
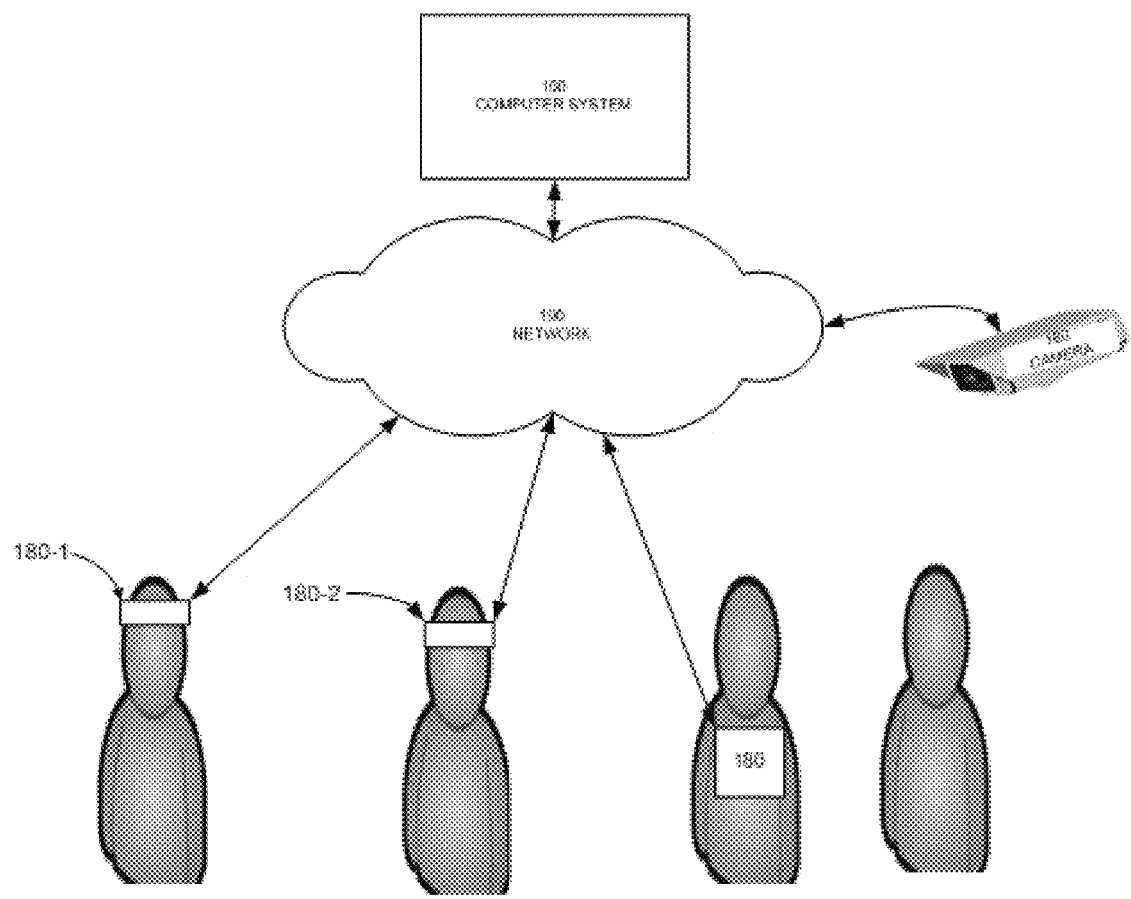
FIG. 1 is a simplified block diagram representation of a networked implementation of a system configured in accordance with selected aspects of the present description.

In this document, the words "embodiment," "variant," "example," and similar expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar expressions and phrases may be used to indicate one of a number of different possible embodiments. The number of possible embodiments/variants/examples is not necessarily limited to two or any other quantity. Characterization of an item as "exemplary" means that the item is used as an example. Such characterization of an embodiment/variant/example does not necessarily mean that the embodiment/variant/example is a preferred one; the embodiment/variant/example may but need not be a currently preferred one. All embodiments/variants/examples are described for illustration purposes and are not necessarily strictly limiting.

The words "couple," "connect," and similar expressions with their inflectional morphemes do not necessarily import an immediate or direct connection, but include within their meaning connections through mediate elements.

"Facial expression" as used in this document signify (1) large scale facial expressions, such as expressions of primary emotions (Anger, Contempt, Disgust, Fear, Happiness, Sadness, Surprise), Neutral expressions, and expression of affective state (such as boredom, interest, engagement, liking, disliking, wanting to buy, amusement, annoyance, confusion, excitement, contemplation/thinking, disbelieving, skepticism, certitude/sureness, doubt/unsureness, embarrassment, regret, remorse, feeling touched); (2) intermediate scale facial expression, such as positions of facial features, so-called "action units" (changes in facial dimensions such as movements of mouth ends, changes in the size of eyes, and movements of subsets of facial muscles, including movement of individual muscles); and (3) changes in low level facial features, e.g., Gabor wavelets, integral image features, Haar wavelets, local binary patterns (LBPs), Scale-Invariant Feature Transform (SIFT) features, histograms of gradients (HOGs), Histograms of flow fields (HOFFs), and spatio-temporal texture features such as spatiotemporal Gabors, and spatiotemporal variants of LBP, such as LBP-TOP; and other concepts commonly understood as falling within the lay understanding of the term.

"Extended facial expression" means "facial expression" (as defined above), head pose, and/or gesture. Thus, "extended facial expression" may include only "facial expression"; only head pose; only gesture; or any combination of these expressive concepts.

"Causing to be displayed" and analogous expressions refer to taking one or more actions that result in displaying. A computer or a mobile device (such as a smart phone, tablet, Google Glass and other wearable devices), under control of program code, may cause to be displayed a picture and/or text, for example, to the user of the computer. Additionally, a server computer under control of program code may cause a web page or other information to be displayed by making the web page or other information available for access by a client computer or mobile device, over a network, such as the Internet, which web page the client computer or mobile device may then display to a user of the computer or the mobile device.

"Causing to be rendered" and analogous expressions refer to taking one or more actions that result in displaying and/or creating and emitting sounds. These expressions include within their meaning the expression "causing to be displayed," as defined above. Additionally, the expressions include within their meaning causing emission of sound.

"Rapport" refers to the quality of the social interaction. It is synonymous to concepts such as social resonance, social synchrony, and non-verbal communication flow.

Other and further explicit and implicit definitions and clarifications of definitions may be found throughout this document.

Reference will be made in detail to several embodiments that are illustrated in the accompanying drawings. Same reference numerals are used in the drawings and the description to refer to the same apparatus elements and method steps. The drawings are in a simplified form, not to scale, and omit apparatus elements, method steps, and other features that may be added to the described systems and methods, while possibly including certain optional elements and steps.

FIG. 1 is a simplified block diagram representation of a computer-based system 100 coupled through a network 190 to user devices 180 (including user devices 180-1 and 180-2). The user devices 180 may be mobile devices such as smartphones, tablets, network-enabled cameras, wearable devices such as Google Glass devices and smart watches. The system 100 and one or more of the user devices 180 may be configured in accordance with selected aspects of this document. The system 100 and/or the one or more user devices 180 may perform the steps of the methods such as the methods described in more detail throughout this document.

FIG. 1 does not show many hardware and software modules, and omits various physical and logical connections. The system 100 and the user devices 180 may be implemented as special purpose data processors, general-purpose computers, and groups of networked computers or computer systems configured in accordance with one or more features described in this document. In some embodiments, the system is built using one or more of cloud devices, smart mobile devices, and wearable devices.

In variants, the system 100 may function as a server facilitating network-based (e.g., internet-based) or face-to-face interactions between a first user at the user machine 180-1 and/or a second user at the user machine 180-2. The system 100 may receive the real time data flows from each of the user machines 180-1 and 180-2; each data flow may include a video flow, as well as data from other sensors, such as accelerometer data, infrared sensor data, and/or audio data. In variants, the interaction is conducted face-to-face in the physical sense (as across a table) and the user devices 180-1 and 180-2 provide the real time video flows of the interaction to the system 100 without the need to implement the interaction through the video flows (as would be the case for videoconferencing). In variants, the interaction is facilitated by another system, and the video flows are provided to the system 100 independent of the video flows to and from the system that actually facilitates the interaction. This may be the case where the interaction is conducted via videoconferencing, perhaps using Skype or another videoconferencing service. In still other variants, the system 100 receives previously recorded video flows from the users, either in a synchronized manner or with sufficient information to be able to synchronize the video flows; in other words, the system 100 has sufficient information to correlate the frames of the different video flows, so that it "knows" which frame of one of the flows corresponds to a given frame of another video flow. Each of the video flows may contain facial images of the users, to allow the system 100 to analyze the facial expressions of the users. Each of the video flows may also contain additional video information that allows the system 100 to analyze gestures of the users, such as shoulder shrugging, nodding, throwing hands up, and other hand, body, and/or gestures/postures. From the synchronized video flows, the system 100 may capture the rapport between a pair of users. The system 100 may also be configured to analyze three or even more video flows of three or more participants in the interaction, and determine rapport existing among all the participants of the interaction, or determine rapport for any or all of the different pairs of the participants in the interaction.

In the case of a video conference, a camera of one of the user devices 180 may be trained on the user of that device, to capture the expressions of the user. In direct interactions, the camera may be built into a wearable device (e.g., Google Glass) and capture the expressions of another participant of the interaction. Thus, when two participants face and interact with each other, the camera of the user device of the participant may capture the expressions of the second participant, and vice versa. The two wearable devices may be networked through another system (such as the system 100); the two user devices may also communicate with each other, either directly or through a network/cloud such as the network 190. In different embodiments, the processing of the video flows for estimating rapport may be performed in the other system (e.g., the system 100), in one of the user devices 180, or the processing may be shared by the user devices 180. The processing may also be shared by the system 100 and one or more of the user devices 180.

Figure 2:
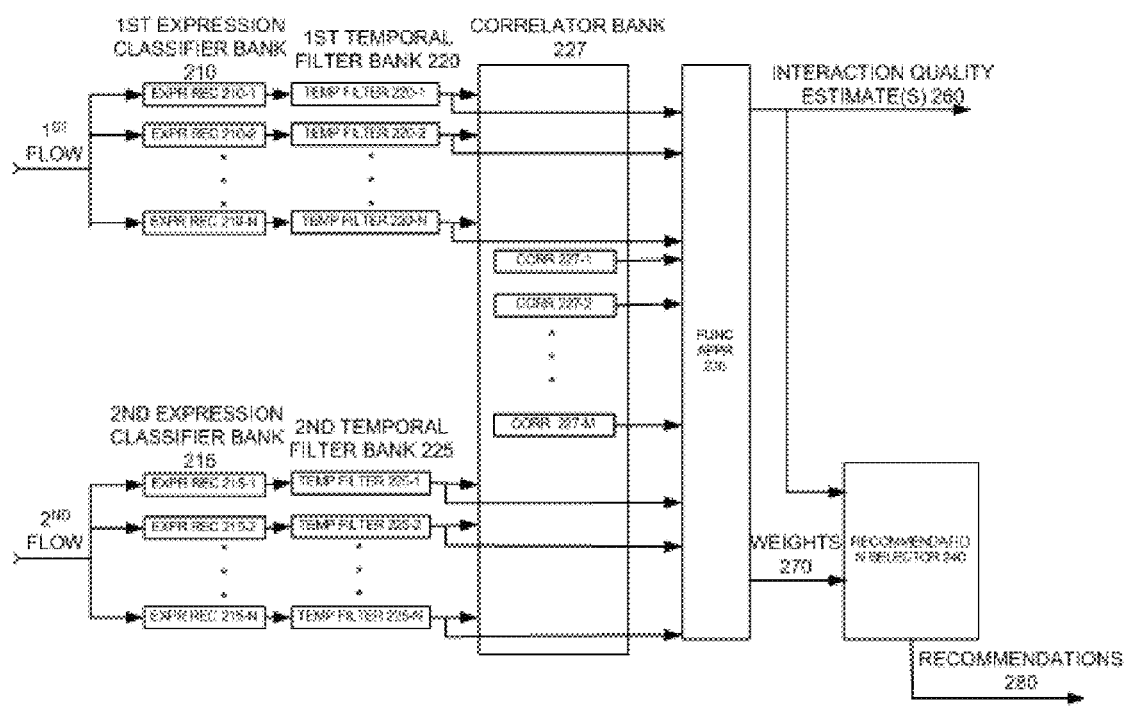
FIG. 2 illustrates selected blocks of a variant of the implementation of FIG. 1.

FIG. 2 is a simplified block diagram representation of selected processing blocks 200 of a system configured in accordance with selected aspects of the present description. The processing blocks 200 may be implemented with the one or more processor(s) of the system 100 and the device(s) 180, configured by software stored in one or more storage components. FIG. 2 also does not show many components and connections of the system.

A first expression classifier bank 210 includes recognizers/classifiers 210-$n$ of extended facial expressions gestures. Each of the classifiers 210-$n$ may be trained to recognize the extended facial expressions corresponding to various states of a person falling under the extended facial expression definition above, as well as affective valence, arousal, other visual indications of affective/mental state. Example of such classifiers include the Computer Expression Recognition Toolbox (CERT), developed at the machine perception laboratory of the University of California, San Diego; and FACET SDK, developed by Emotient.

The first classifier bank 210 receives a first video flow from the first user device 180-1. Each of the classifiers 210-$n$ produces a stream of numbers associated with the frames of the first flow, for example, numbers indicative of the probability that (or degree to which) the person shown in the first video flow at the current time experiences a particular emotion or affective state, exhibits a particular gesture/grimace (e.g., smile, smirk, frown, shrugged shoulders, etc.), or exhibits one or more action units. Thus, one of the classifiers 210-$n$ may output a signal that is a stream of numbers indicating probability of happiness; another, of sadness; a third of interest; a fourth, of smiling; a fifth, of frowning; a sixth, of shoulder shrugging, etc.

The first classifier bank 210 may also receive signals from additional, non-visual sensors. The additional sensors of the user devices 180 (or of still other devise) may include, for example, accelerometers, infrared sensors, audio/speech sensors. The accelerometer and the infrared sensors may provide signals carrying information about head and eye (gaze) movements, for example. To process these data, the first classifier bank 210 may include classifiers 210-$n$ trained on the non-visual sensors. Moreover, some of the classifiers 210-$n$ may process visual and non-visual signals jointly. For example, a "nodding" classifier may make a decision regarding a person nodding based jointly on the video of the person and the accelerometer signal from the person's wearable device 180.

A second expression classifier bank 215 can be identical or analogous to the first expression classifier bank 210, but operate on (receive and processes) a second data flow (video and/or other sensor data) from the second user device 180-2. Thus, the individual classifiers 215-$n$ produce streams of numbers obtained through analysis of the second data flow from the user device 180-2.

A first temporal filter bank 220 includes a number of temporal filters 220-$n$, each coupled to one of the classifiers 210-$n$ to receive the signal (the sequence of numbers) output by the associated classifier 210-$n$. The temporal filters 220-$n$ are configured to detect temporal signal patterns in time. The temporal filters may include temporal Gabor filters, moving average filters, moving median filters, Haar wavelets filters, Kalman filters, Recurrent Neural Networks, Hidden Markov Models, Reservoir Neural Networks, and others. For example, one of the temporal filters may look for a pattern where a smile detector output signal goes up slowly and comes down slowly, another temporal filter may look for the pattern of the smile detector output signal going up and down quickly. Temporal filters in effect attempt to detect signatures in the temporal dynamics of the facial expressions and gestures. The filters may operate on different time scales and with different delays.

A second temporal filter bank 225 can be identical or analogous to the first temporal filter bank 210, but its filters 225-$n$ are coupled to receive the outputs of the classifiers 215-$n$ of the second expression classifier bank 215, and to detect temporal signal patterns in the signals corresponding to the second video flow (and, if applicable, of the non-visual sensors such as accelerometer, infrared, and/or audio sensors).

A correlator bank 227 includes a number of correlators 227-$m$ that compute the correlation between a subset of filter outputs for the two users, that is, the outputs of the filter banks 220 and 225. Examples of such correlators include, but are not limited to, local regression filters, canonical correlation filters, multiple regression filters, Shannon Mutual Information Detectors, Independent Component Analysis modules, and others. Note that in this document, "correlation," "correlator," and their inflectional morphemes are used both in the strict mathematical sense, as well as in a more general sense, that of coupling or lack of statistical independence between two or more signals. By way of examples, correlation refers to linear correlation, canonical correlation, linear regression, and non-linear correlation such as Shannon mutual information indexes.

A function approximator 230 receives the outputs of the correlators 227, the outputs of the temporal filters 220-$n$ of the first temporal filter bank 220, and the outputs of the temporal filters 225-$n$ of the second temporal filter bank 225. From these signals (if they are available), the function approximator 230 generates one or more estimates 260 of the quality of the interaction. This block may be a machine learning system trained to identify patterns in the expressions of individual participants of an interaction, that is, it looks for correlation patterns of the correlators 227, and the signals from the temporal filter banks 220/225, that are predictive or indicative of a good or a bad interaction between the users. Example of function approximators include modules configured to perform multivariate linear regression, kernel regression, support vector regression, structured support vector regression, deep neural networks, etc. Note that the function approximator 230 may operate in the absence of some of the input signals (and in embodiments may not be connected to receive them); thus, the system can still work with only the correlator inputs into the function approximator, with only the first temporal filter inputs into the function approximator, only the second temporal filter inputs, or any combination of these inputs. (An example of this will be illustrated below with reference to FIG. 3.)

The function approximator 230 may be trained as follows. Video clips of interactions are presented to human observers (such as crowdsourcing providers) that judge the rapport between the two participants. In variants of the labeling procedure, videos clips of different lengths are presented to the human observers to judge the overall level of rapport observed in the entire clip or selected portions of the clip. In other variants of the labeling procedure, the observers judge the ongoing quality of the interaction continually or continuously time, using a continuous/continual audience response method (e.g., observers turn a dial in real time to indicate their impression of the observed rapport quality). In variants, the observers are behavioral experts (e.g., trained in the Facial Action Coding System or FACS). In variants, a pool of observers is used to target specific types of interactions (e.g., salesperson-customer interactions, women and men of a specific age for dating applications, expert interviewers for hiring computer programmers, etc.). In some examples, the quality of rapport of the observed interaction may be determined or affected by the outcome of the interaction—such as an invitation to a follow-up interview, arrangements for a date, exchange of follow-up messages.

As one example, the function approximator 230 may look for mimicry of one interaction participant by the other interaction participant. Such mimicry generally suggests a positive rapport between the users. The mimicry need not be standard mimicry. For example, it may be that a particular movement of eyebrows by one participant is followed by a smile of the other participant some time later (say, between two seconds and five seconds later) suggests good rapport. In essence, the function approximator 230 may look for statistical patterns predictive or indicative of good and bad rapport.

It should be noted that, in embodiments, the function approximator 230 may operate without considering verbal rapport, for example, by considering solely non-verbal rapport, such as rapport derived from visual signals and from the other sensors (accelerometer, infrared).

In embodiments, the function approximator 230 generates multiple rapport quality estimates 260 for different time scales, including short, medium, and/or long.

The estimate or estimates 260 of interaction quality may be provided to one or both participants, for example, mailed, emailed, made accessible through a website, caused to be rendered by the participants' user devices, or otherwise provided to the participants. The estimates may be provided together with the display of the recordings of the interaction, so that the participant may see the changes in the estimated quality of the interaction as the interaction progresses.

The function approximator 230 is connected to a recommendation selector 240, which is configured to select one or more recommendations 280 for improving future interactions. The selector 240 may receive one or more of the interaction quality estimates 260 and the "weights" 270 of the machine learning correlator 230. The recommendations 280 may include, for example, suggestions to smile more or less, to mimic all or selected expressions of the other participant, and others. Generally, the recommendations 280 may include suggestions to express or abstain from expressing certain emotions, to mimic or to abstain from mimicking, and to move/gesticulate or not to move/gesticulate in general or in specific ways.

The recommendation selector 240 may be configured to relate certain weights 270 of the function approximator 230 to the specific recommendations 280, which the system 100 then can provide (e.g., display in real time or later, email, mail, make available through a server or a website, or otherwise) to a participant, to another person, or to an entity (company, government agency, such as the participant's employer).

Machine learning systems have parameters that define connections from their inputs to their outputs. Often, these parameters may be interpreted, for example, one feature or weight or filter output affects the total rapport negatively or positively, and to what extent. The function approximator 230, being a machine learning system, may compute the quality of interaction (or part of the interaction) by adding products of certain features of an interaction with corresponding weights 270 of the function approximator 230 that have been set through machine training. Thus, the function approximator 230 has the information regarding which features improve or lower the quality of the estimates, and how important those features are to the quality of the estimates. Based on the weights 270, which are provided to the recommendation selector 240, the selector may select suggestions to increase those features that are most important to increases in the interaction quality, and to decrease those features that are most important contributors to reductions in the interaction quality. For example, each weight 270 may have a corresponding suggestion, and the selector 240 may select one, two, three, or any other number of them based on the relative importance of the corresponding features in the estimates of quality. Thus, the recommendation selector 240 may select one or more recommendations 280 that can be expected to have the greatest effect in improving the rapport of the interaction.

Figure 3:
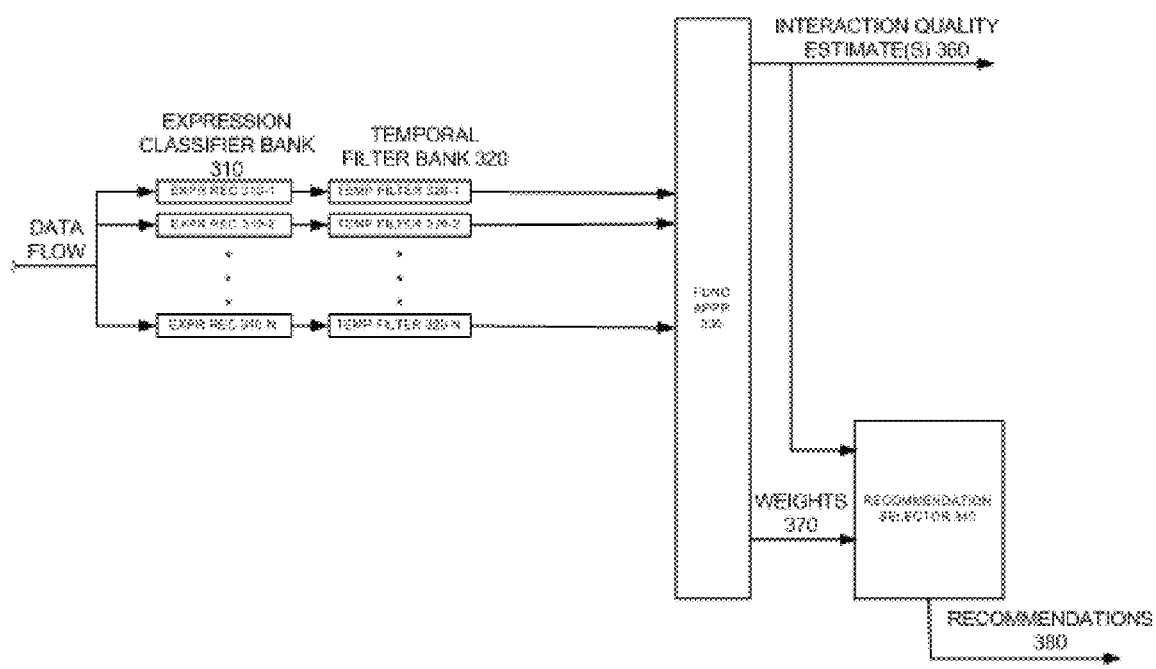
FIG. 3 illustrates selected blocks of another variant of the implementation of FIG. 1.

FIG. 3 is a simplified block diagram representation of selected processing blocks 300 of a variant of the system 100 configured in accordance with selected aspects of the present description. The processing blocks 200 may be implemented with the one or more processor(s) of the system 100 and the device 180, configured by software stored in one or more of the storage components. FIG. 3 does not show many components and connections of the system 100.

FIG. 3 shows an expression classifier bank 310 and its classifiers 310-*n* are identical or analogous to the classifier bank 210 and the classifiers 210-*n* of FIG. 2, respectively, and may be trained in the same way. The inputs to the classifiers 310-*n* may include inputs from non-visual sensors (e.g., accelerometer, infrared, audio), as was also the case with the classifiers 210-*n* of FIG. 2. The classifiers 310-*n* may be trained in the same way as the classifiers 210-*n*.

A temporal filter bank 320 includes a number of temporal filters 320-*n*, each coupled to one of the classifiers 310-*n* to receive the signal output by the associated classifier 310-*n*. Once again, the bank 320 and its temporal filters 320-*n* may be identical or analogous to the bank 220 and the filters 220-*n* of FIG. 2, respectively, and may operate in the same or analogous manner.

A function approximator 330 may be identical or analogous to the function approximator 230, and may be trained in the same or analogous way. Here, however, the function approximator 330 receives the outputs of the temporal filters 320-*n*, rather than correlator outputs. The approximator 330 is a machine learning system trained to identify patterns in the expressions of a single person, who may be a participant of an interaction with another person-participant. The rapport of the interaction may be estimated from the extended facial expressions and other data related to the single participant. For example, if the participant appears "happy," it may be inferred that the rapport is good. In operation, the function approximator 330 looks for correlation patterns in the outputs of the temporal filters 320 that are predictive or indicative of good and bad interaction between the participants.

A recommendation selector 340 may be identical or analogous to the recommendation selector 240 of FIG. 2, and may function in the same or an analogous way. It may be configured to select one or more recommendations 380 for improving the current or a future interaction, based on the quality estimates 360 and/or the weights 370 of the function approximator 330.

The system shown in FIG. 3 is unlike the system shown in FIG. 2 in that the data from one of the participants is not used; the quality estimates may be generated based on the data from the other participant. In a customer service or sales interaction, the customer would typically be the one from whose data the rapport is judged. In embodiments, the system is part of a wearable device, such as Google Glass, worn by a sales representative or a customer service representative.

In variants, a single system can operate in the mode shown in FIG. 2 and in the mode shown in FIG. 3. For example, the mode may depend on the availability and/or quality of the data from one of the participants: if data flows of sufficient quality are available for both participants, the system may operate as is described with reference to FIG. 2; if a data flow of sufficient quality is available only for one of the participants, the system may operate as is described with reference to FIG. 3.

The system and process features described throughout this document may be present individually, or in any combination or permutation, except where presence or absence of specific feature(s)/element(s)/limitation(s) is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in non-transitory machine-readable storage medium.

This document describes in detail the inventive apparatus, methods, and articles of manufacture for estimating quality of interaction. This was done for illustration purposes. The specific embodiments/variants/examples or their features do not necessarily limit the general principles underlying the disclosure of this document. The specific features described herein may be used in some embodiments/variants/examples, but not in others, without departure from the spirit and scope of the invention(s) as set forth herein. Various physical arrangements of components and various step sequences also fall within the intended scope of the disclosure. Many additional modifications are intended in the foregoing disclosure, and it will be appreciated by those of ordinary skill in the pertinent art that in some instances some features will be employed in the absence of a corresponding use of other features. The illustrative examples therefore do not necessarily define the metes and bounds of the invention(s) and the legal protection afforded the invention(s).

What is claimed is:

1. A computer system for estimating quality of an interaction between a first participant and a second participant, the system comprising:

a first plurality of machine learning classifiers of extended facial expressions, each classifier of the first plurality of classifiers being configured to generate a stream of first estimates of the degree to which a predetermined emotion or affective state corresponding to said each classifier of the first plurality of classifiers is present in a data stream of the first participant;

a second plurality of machine learning classifiers of extended facial expressions, each classifier of the second plurality of classifiers being configured to generate a stream of second estimates of the degree to which a predetermined emotion or affective state corresponding to said each classifier of the second plurality of classifiers is present in a data stream of the second participant, wherein the first and second data streams are synchronized;

a first plurality of temporal filters, each filter of the first plurality of temporal filters comprising an input connected to receive output of an associated classifier of the first plurality of classifiers, and an output;

a second plurality of temporal filters, each filter of the second plurality of temporal filters comprising an input connected to receive output of an associated classifier of the second plurality of classifiers, and an output;

a plurality of correlators configured to receive output signals from the first and second pluralities of temporal filters and to identify correlation patterns in the output signals of the first and second pluralities of temporal filters; and a function approximator configured to receive at least some of output signals of the plurality of correlators, the output signals of the first plurality of temporal filters, and the output signals of the second plurality of temporal filters, the function approximator being machine trained to generate one or more estimates of quality of the interaction between the first participant and the second participant based on at least some of the output signals of the plurality of correlators, the output signals of the first plurality of temporal filters, and the output signals of the second plurality of temporal filters; and a recommendation selector coupled to the function approximator to receive from the function approximator the one or more estimates and machine learning weights of the function approximator, the recommendation selector being configured to generate one or more suggestions regarding the interaction.

2. A computer system as in claim 1, wherein the data stream of the first participant comprises a first video of extended facial expressions.

3. A computer system as in claim 2, wherein the first plurality of machine learning classifiers, the second plurality of machine learning classifiers, the first plurality of temporal filters, the second plurality of temporal filters, the plurality of correlators, the machine learning function approximator, and the recommendation selector are configured to provide the one or more suggestions in real time.

4. A computer system as in claim 2, wherein the computer implemented system is implemented using at least one wearable device.

5. A computer system as in claim 2, wherein the computer implemented system is implemented using at least one set of glasses.

6. A computer system as in claim 2, wherein the computer system is configured to receive at least one data stream of the data stream of the first participant and the data stream of the second participant from a wearable device.

7. A computer system as in claim 2, wherein the computer system is configured to receive the data stream of the first participant from a second wearable device of the second participant, and to receive the data stream of the second participant from a first wearable device of the first participant.

8. A computer system as in claim 2, wherein:
the data stream of the first participant comprises first video and first non-visual sensor data; and
the data stream of the second participant comprises second video and second non-visual sensor data.

9. A computer-implemented method for estimating quality of an interaction between a first participant and a second participant, comprising steps of:

processing a data stream of the first participant with a first plurality of machine learning classifiers of extended facial expressions, each classifier of the first plurality of classifiers being configured to generate a stream of first estimates of the degree to which a predetermined emotion or affective state corresponding to said each classifier of the first plurality of classifiers is present in the data stream of the first participant;

processing a data stream of the second participant with a second plurality of machine learning classifiers of extended facial expressions, each classifier of the second plurality of classifiers being configured to generate a stream of second estimates of the degree to which a predetermined emotion or affective state corresponding to said each classifier of the second plurality of classifiers is present in the data stream of the second participant, wherein the first and second data streams are synchronized;

processing signals at outputs of the first plurality of classifiers with a first plurality of temporal filters, each filter of the first plurality of temporal filters comprising an input connected to receive output of an associated classifier of the first plurality of classifiers, and a temporal filter output;

processing signals at outputs of the second plurality of classifiers with a second plurality of temporal filters, each filter of the second plurality of temporal filters comprising an input connected to receive output of an associated classifier of the second plurality of classifiers, and a temporal filter output;

correlating output signals from the first and second pluralities of temporal filters to identify correlation patterns in the output signals of the first and second pluralities of temporal filters, thereby obtaining a plurality of correlator output signals; and generating with a machine learning function approximator one or more estimates of quality of the interaction between the first participant and the second participant based on at least some of the plurality of correlator output signals, the temporal filter outputs of the first plurality of temporal filters, and the temporal filter outputs of the second plurality of temporal filters, wherein the method is performed using at least one wearable device and further comprising:

selecting one or more suggestions for improving the interaction based on the one or more estimates of quality of the interaction and machine learning weights of the function approximator; and providing the one or more suggestions to at least one of the first participant and the second participant.

* * * * *